United States Patent
Konosu et al.

(10) Patent No.: US 6,394,731 B1
(45) Date of Patent: May 28, 2002

(54) WORK ASSIST DEVICE

(75) Inventors: Hitoshi Konosu; Yoji Yamada, both of Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/398,208

(22) Filed: Sep. 17, 1999

(30) Foreign Application Priority Data

Sep. 17, 1998 (JP) .......................................... 10-263348

(51) Int. Cl.$^7$ ................................................. B65J 3/00
(52) U.S. Cl. ........................................ 414/5; 700/213
(58) Field of Search ................................. 700/213, 260, 700/261; 901/9; 414/5, 6; 212/285, 330, 331, 338

(56) References Cited

U.S. PATENT DOCUMENTS

| | | | | |
|---|---|---|---|---|
| 3,923,166 A | * | 12/1975 | Fletcher .......................... | 214/1 |
| 3,940,110 A | * | 2/1976 | Motoda ....................... | 254/168 |
| 4,122,678 A | * | 10/1978 | Wilson .......................... | 60/271 |
| 4,302,138 A | * | 11/1981 | Zarudiansky .................. | 414/5 |
| 5,007,300 A | * | 4/1991 | Siva ............................. | 74/471 |
| 5,018,922 A | * | 5/1991 | Yoshimnada et al. .......... | 414/5 |
| 5,116,180 A | * | 5/1992 | Fung et al. .................... | 414/5 |
| 5,125,270 A | * | 6/1992 | Kovacevic .................... | 73/379 |
| 5,193,963 A | * | 3/1993 | McAffee et al. ............... | 414/5 |
| 5,549,439 A | * | 8/1996 | Ploem ......................... | 414/680 |
| 5,551,308 A | * | 9/1996 | Arai et al. ............. | 73/862.541 |
| 5,576,727 A | * | 11/1996 | Rosenberg et al. ......... | 345/179 |
| 5,577,417 A | * | 11/1996 | Fournier ...................... | 74/523 |
| 5,898,599 A | * | 4/1999 | Massic et al. ............... | 364/578 |
| 5,915,673 A | * | 6/1999 | Kazerooni ..................... | 414/5 |

FOREIGN PATENT DOCUMENTS

| | | |
|---|---|---|
| JP | 2-292193 | 12/1990 |
| JP | 3-117574 | 5/1991 |
| JP | 10-151590 | 6/1998 |

OTHER PUBLICATIONS

Kazerooni, "Human–Robot Interaction via the Transfer of Power and Information Signals", IEEE Transactions on Systems, Man, and Cybernetics, vol. 20, No. 2, Mar./Apr. 1990, pp. 450–463.

Hogan, Inpedance Control: An Approach to Manipulation: Part I—Theory through Part III—Applications, Journal of Dynamic Systems, Measurement and Control, vol. 107, No. 1, Mar. 1985, pp. 1–23.

Akella, et al., "Cobots for the Automobile Assembly Line", IEEE, May 1999, pp. 728–733.

Kosuge, et al., "Control of Man–Machine System Based on Virtual Tool Dynamics", 1994, pp. 211–217.

Kosuge, et al., "Motion Generation of Robot in Cooperation with Human", pp. 393–394.

Ikeura, et al., "Experimental Evaluation for a Robot Carrying an Object with a Human", Jun. 1998, pp. 2A111–3(1 & 2).

* cited by examiner

*Primary Examiner*—Christopher P. Ellis
*Assistant Examiner*—Khoi H. Tran
(74) *Attorney, Agent, or Firm*—Pillsbury Winthrop LLP

(57) ABSTRACT

The present invention relates to a device for assisting an operator in carrying heavy articles. The device is provided with a movable body for supporting the heavy article, an actuator for actuating the movable body, and a controller for adjusting the output of the actuator. The controller adjusts the actuator such that a force obtained by subtracting a resultant force of force proportional to acceleration of the heavy article, force proportional to speed, and force proportional to position value from force required for moving the heavy article with a same movement as that performed at that point. Further, coefficients proportional to acceleration, speed, and position value are changed during the series of carrying work. Especially, it is useful that the coefficients be changed according to the task process phases. It makes an operator feel as if he were changing assist device to an appropriate one for each task process phase. The operator is able to work under various environments with a feeling which is convenient for performing his work well.

5 Claims, 4 Drawing Sheets

$$F_T = Mv\ddot{x} + Dv\dot{x} + Kvx \quad \cdots (1)$$
$$F_h = M\ddot{x} + D\dot{x} + Kx \quad \cdots (2)$$
$$F_A = Mv\ddot{x} + Dv\dot{x} + Kvx$$
$$- (M\ddot{x} + D\dot{x} + Kx) \quad \cdots (3)$$

FIG. 3A

| | | SKILLD OPERATOR | | |
|---|---|---|---|---|
| | | OPERATOR B | | |
| | | OPERATOR A (FATIGUED STATE) | | |
| OPRATION PHASE | EQUIVALENT MASS | EQUIVALENT VISCOSITY | EQUIVALENT SPRING CONSTANT |
| 1 SPEED INCREASE PROPHASE | | | |
| 2 SPEED INCREASE ANAPHASE | | | |
| 3 SPEED DECREASE PROPHASE | | | |
| 4 SPEED DECREASE ANAPHASE | | | |

(OPERATOR A (NORMAL STATE))

WORK ASSIST DEVICE

The disclosure of Japanese Patent Application No. HEI 10-263348 filed on Sep. 17, 1998 including the specification, drawings and abstract is incorporated herein by reference in its entirety.

BACKGROUND OF THE INVENTION

1. Field of the Invention

The present invention relates to an art for assisting an operator in carrying heavy articles, with which an operator is able to carry heavy articles using an assist device while feeling as if he were carrying a light article.

2. Description of the Related Art

Many attempts have been made for the realization of the above-mentioned art. An example is disclosed in "Control of Man-Machine System Based on Virtual Tool Dynamics" (Kazuhiro KOSUGE, Yoshio FUJISAWA and Toshio FUKUDA, Transactions of the Japan Society of Mechanical Engineers, Series C, Vol. 60, No. 572 (1994-4) pp. 211–217). It is reported, that when the actuator output is controlled by a human in a robot cooperation system so that the equation, $$M_v\, d^2x/dt^2 + D_v\, dx/dt + K_v\, x = Q\, F_h - F_e$$

is satisfied, when an operator is working in cooperation with a robot, the operator is able to perform the work as if he were using a tool for amplifying the operating force of such tools as a nail puller, a pair of pincers, and a wrench. In the above equation, $M_v$ is the mass matrix of a virtual tool, $D_v$ is the matrix of viscosity coefficient, and $K_v$ is the spring constant matrix, each being an n×n matrix. Q is the magnification for amplifying the force of an operator, $F_h$ is the operating force of the operator, $F_e$ is the force applied to an object article by a manipulator, and x is the position of the object article. Further, $M_v$, $D_v$, and $K_v$ are values determined based on the characteristics of tools equivalent to the robot from the standpoint of an operator.

In the art "Motion Generation of Robot in Cooperation with Human" (Kazuhiro KOSUGE and Norihide KAZAMURA) in Transactions of the Fifteenth Japan Robot Society Sessions, pp. 393–394, there is disclosed a carrying system wherein human and robot cooperate to carry articles, an actuator output is controlled so that the equation, $$M_v\, d^2x/dt^2 + D_v\, dx/dt + K_v\, x = F_h$$

is satisfied. Further, the values of $M_v$, $D_v$, $K_v$, and the like were varied to experimentally confirm the change in operability in a system where human and robot cooperate to carry articles. According to the results thus reported, it is easier to carry the articles smoothly when a larger coefficient for acceleration $d^2x/dt^2$ (mass matrix $M_v$ of the virtual tool) is taken (referred to as an impedance control), and it is easier to move the articles by small notches when a larger coefficient for speed $dx/dt$ (matrix of viscosity coefficient $D_v$) is taken (referred to as damping control). Conversely, it is reported that it is difficult to move the articles in small notches during impedance control and that it is difficult to move the articles smoothly and substantially linearly during damping control. It is further reported that the mass matrix $M_v$ and the matrix of viscosity coefficient $D_v$ needs to be adjusted to proper values depending on the type of cooperation work conducted. Also, the spring constant matrix $K_v$ is set to 0 in the report, because a spring force, which changes according to the position, ordinarily does not act when carrying an article. However, the spring constant matrix $K_v$ cannot be set to 0 when carrying an article subject to spring force and therefore, it can be easily apprehended that there exists an appropriate value for spring constant matrix $K_v$ for providing a good operability.

A series of papers described above report a realization of good-quality work, without giving an operator a disagreeable feeling, by providing a behavior equivalent to that when force amplification tool such as a nail puller is employed by using an assist force of a robot. Also, it is reported that a tool capable of realizing equivalent characteristics depending on the type of work needs to be selected, so that casually selecting the mass matrix $M_v$, matrix of viscosity coefficient $D_v$, spring constant matrix $K_v$, and the like leads to working with inappropriate tool for intended work. This results in difficulty of accurately positioning an article at a target position after carrying the article smoothly near the target position, in the case of carrying the articles. The locus of the article until it is carried near the target position tends to be zigzag rather than a smooth line. Accordingly, it is reported that it is necessary to change the control method for the assist force needs to be changed.

"Experimental Evaluation for a Robot Carrying an Object with a Human" (Ryojun IKEURA, Haruaki KOZAWA and Kazuki MIZUTANI, Japan Society of Mechanical Engineers No. 98-4 Robotics-Mecbatronics Sessions 98 Transactions 2AIII-3(1) to (2)) discloses a recognition that it is necessary to change the viscosity coefficient (described as damping coefficient) established between the operating force of an operator and the speed of the article during a work to construct a cooperation system free from disagreeableness. To this end, a method for altering the viscosity coefficient according to the time lapsed from the start is proposed by this paper.

The first and the second papers described earlier indicate important views in constructing a cooperation system that does not make an operator feel disagreeable, and have made great achievements. However, because the system stands on the ground of using an equivalent tool, no consideration is made as to the view corresponding to exchange of tools during a series of work.

In the third paper mentioned earlier, changing of the viscosity coefficient according to time lapsed is discussed, which almost corresponds to sequentially changing tools during work. However, there is no general consideration as to what characteristics to give to what work. Further, because the analysis result is based on only one type of work, it contains no information on how to change the mechanical properties of the assist device when the content of work is changed. Further, the object to be changed timewise is limited to the viscosity coefficient (equivalent to mass) and therefore the proportional coefficient established between the acceleration and force proportional to acceleration is not considered.

SUMMARY OF THE INVENTION

The present invention has been made to improve the state of the art, and it makes a new proposal for how to change the mechanical properties during a series of work.

It was also found that it is necessary that an operator feels appropriate reaction force in realizing the aforementioned good work, and still further, it is necessary to change the reaction force pattern required by the operator according to the content of work, task process phase, operator, work duration, experience, state of fatigue of the operator, and the like. Therefore, another object of the present invention is to realize a work assist device which satisfies such requirements.

According to a first aspect of the present invention, the work assist device includes a movable body for supporting heavy articles, an actuator for actuating the movable body, and a controller for controlling the output of the actuator. The controller controls the output of the actuator such that the relationship between the force applied to the movable body by the operator and the movement of the heavy article realized through the movement of the movable body is equivalent to the relationship between the force generated by application of the equivalent force to a virtual article placed in a free space and which is lighter than the heavy article and the movement created thereby. Further, the controller adjusts the actuator output such that the equivalent mass of the virtual article fluctuate during a series of carrying work.

According to the first aspect, the output of the actuator is adjusted when an operator applies operating force to the movable body. Then, the operating force of the operator (referred to as reaction force) together with the output from the actuator creates movement of the heavy article through the movable body. The output from the actuator is adjusted such that the movement of the heavy article realized at this point is equal to the movement realized when the same operating force is applied to a lighter article without any assist force. Further, the output from the actuator is adjusted such that the heavy article moves as if the weight or the mass of the lighter article (referred to as the virtual article because it does not exist) fluctuated during a series of movement. From the standpoint of the operator, this means that the operator performs the work with the operating force required when dealing with an object article whose weight or mass fluctuates.

It was confirmed by experiment that a good-quality work is easy to realize when the output of the actuator is adjusted such that the force required of the operator is the force required when the weight or mass of the virtual article (referred to as equivalent mass) changes. That is, the operator is able to perform work with reaction force (or resistance) most convenient for the work during a series of work. The operator is able to work with appropriate reaction forces when dynamically and smoothly moving an article or when accurately moving an article by a small amount, resulting in a movement intended by the operator.

Further, it was found by a series of experiments that carrying of articles can be classified into several movement phases. When an article is carried by an operator, the article goes through a speed increase period after start and to a speed decrease period, and then it is positioned at a target position while being decelerated. In detail, the period of speed increase can be classified into two phases, prophase wherein the absolute value of acceleration increases and anaphase wherein the absolute value of acceleration decreases. Further, it was confirmed that the speed decrease period can also be classified into two phases, prophase wherein the absolute value of acceleration increases and the anaphase wherein the absolute value of acceleration decreases.

Changing the equivalent mass according to such state (referred to as task process phase) during a series of movements makes it easier to perform the work, increases the work speed, reduces error, and reduces work load.

In a second aspect of the present invention, the work assist device includes a movable body for supporting a heavy article, an actuator for actuating the movable body, and a controller for adjusting the output of the actuator. The controller adjusts the actuator such that a force obtained by subtracting a resultant force of force proportional to acceleration of the heavy article, force proportional to speed, and force proportional to position value from force required for moving the heavy article with the same movement as that performed at that point. Also, coefficients proportional to acceleration, speed, and position value (the coefficient for position value is usually fixed at zero) are changed during the series of carrying work. Here, not all three types of coefficients need to be changed.

By providing the above-mentioned controller in the work assist device, a cooperation work is realized by an operator applying a resultant force of force proportional to the acceleration of the heavy article, force proportional to speed, and force proportional to position value. Further, the coefficients for making the force proportional to acceleration, speed, and position value (the coefficient for position value is usually fixed at zero) are changed during the series of carrying work. This makes it possible for the operator to continue work as if he were exchanging the assist devices having different mechanical properties. The operator is able to work using appropriate assist devices when dynamically and smoothly moving an article or when accurately moving an article by a small amount, resulting in a movement intended by the operator.

Here again, it is useful to change each coefficient according to the task process phases described earlier. It makes an operator feel as if he were selecting an appropriate assist device for each task process phase.

Here, it is extremely desirable that the changing pattern of coefficients proportional to acceleration, speed, and position value, is selectable according to one or more indexes including operator, work duration, experience, and state of fatigue of the operator.

For example, some operators are good at handling complicated works and some operators are good at handling speed-demanding works. Accordingly, the feeling with which one finds it easy to perform his work well differs between the operators. Also, the feeling with which one finds it convenient to perform his work well differs depending on the work duration and the state of fatigue of the operator. Therefore, by making it possible to select the changing pattern of the coefficient proportional to acceleration, coefficient proportional to speed, and coefficient proportional to position value, during carrying work, according to one or more of the indexes, the operator, work duration, experience, state of fatigue of the operator, an operator is able to work under various environments with a feeling which is convenient for performing his work well.

DETAILED DESCRIPTION OF THE PREFERRED EMBODIMENTS

An embodiment of the present invention will be described hereunder.

Figure 1:
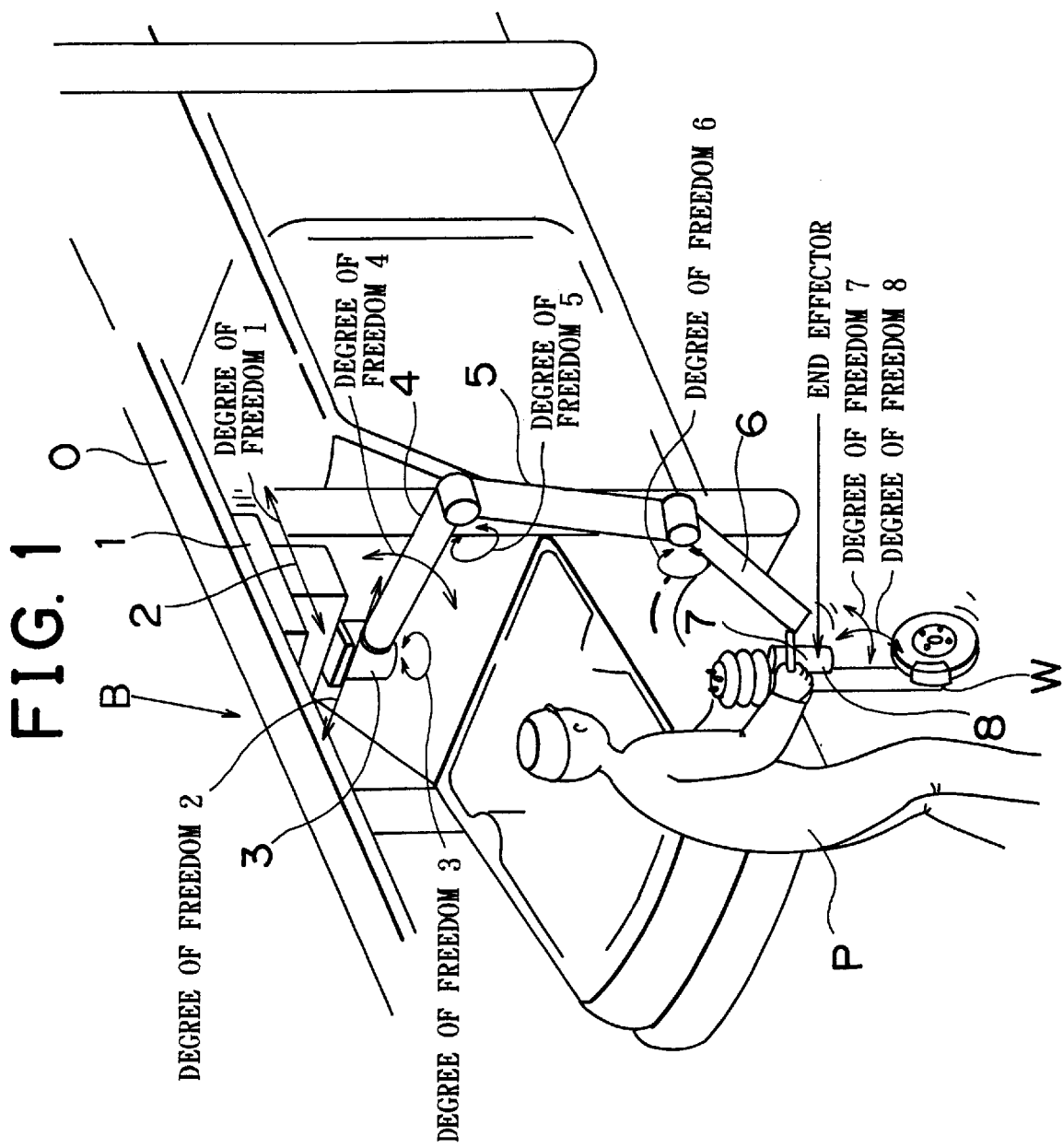
FIG. 1 is an illustration of an overall construction of a work assist device.

FIG. 1 is an illustration of an overview of a work assist device B according to the present embodiment, which assists an operator P in carrying a heavy member (heavy article W). Accordingly, the operator is able to actually carry the heavy article W by only applying force thereto which is required when carrying a lighter article. Further, the heavy article W in the present embodiment is a suspension member of a vehicle.

The work assist device B includes a fixed rail 0, a first movable body 1 slidable in a direction of degree of freedom 1 along the fixed rail 0, a second movable body 2 slidable in a direction of degree of freedom 2 with respect to the first movable body 1, a third movable body 3 rotatable in a direction of degree of freedom 3 with respect to the second movable body 2, a forth movable body 4 swingable in a direction of degree of freedom 4 with respect to the third movable body 3, a fifth movable body 5 swingable in a direction of degree of freedom 5 with respect to the fourth movable body 4, a sixth movable body 6 swingable in a direction of degree of freedom 6 with respect to the fifth movable body 5, a seventh movable body 7 swingable in a direction of degree of freedom 7 with respect to the sixth movable body 6, and an eighth movable body 8 swingable in a direction of degree of freedom 8 with respect to the movable body 7 and which is capable of fixing the heavy article W. The movable bodies 1 through 8 are actuated by actuators A1 through A8 not shown in the drawing.

The operator P grippingly supports the eighth movable body 8 which is a final movable body, moves the eighth movable body 8 to a place where the heavy article W is stored, and fixes the heavy article W to the eighth movable body 8. Next, the operator P carries the heavy article W fixed to the eighth movable body 8 by moving and rotating the eighth movable body 8 in a direction necessary for a carrying work. The output of the actuators Al through A8 are adjusted such that the force required for moving and rotating the eighth movable body 8 is that when carrying an article lighter than the heavy article W without using the work assist device B.

A position sensor not shown is built into the eighth movable body 8, and the position and posture of the heavy article W are detectable momentarily.

Figure 2:
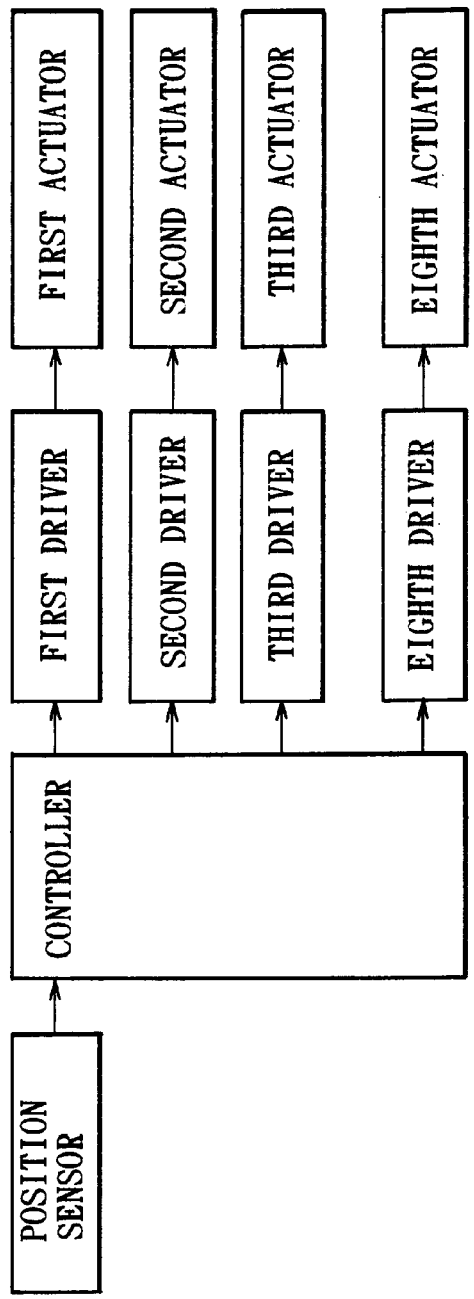
FIG. 2 is a diagram typically illustrating a construction of a controller and calculation conducted.

Upper half of FIG. 2 illustrates a connection between the position sensor, a controller, a driver, and the actuator, wherein the driver adjusts an electric power supplied to the actuator using the signals from the controller. A driver is provided or each actuator.

Formula (1) in FIG. 2 indicates a conceptual equation of motion of the work device and the heavy article W in the entire system. Here, $M_y$, $D_y$, and $K_y$ are mass matrix, viscosity coefficient matrix, and spring constant matrix, respectively, of the entire system, and are measured in advance. Also, in this case, the spring constant matrix $K_y$ is zero, because the heavy article W is not bound. x indicates a position of the heavy article in terms of a degree of freedom, and is detected by the position sensor. A first differential corresponds to speed and a second differential corresponds to acceleration, and they are obtained by differentiating the position information detected by the position sensor by time. A speed sensor and an acceleration sensor may be attached to the movable body 8 instead of the position sensor. The acceleration sensor may be replaced by force sensor.

Thus, the right side of formula (1) is calculated. Accordingly, a total force $F_T$ necessary for moving the heavy article W, with respect to the first degree of freedom, at a movement actually being conducted is calculated. Similarly, respective forces are calculated for the second degree of freedom and thereafter.

If a total force $F_T$ (total force here does not refer to a simple algebraic sum, but is the sum of force being transmitted to the final movable body 8 via respective movable bodies) is being output with respect to the first degree of movement at that moment without an operating force. However, thus controlling the actuator output creates a disagreeable feeling on the side of the operator and therefore he is not able to perform good carrying work.

Accordingly, calculation indicated by a formula (2) is conducted in the present embodiment. Here, M is a proportional constant and corresponds to equivalent weight or mass felt by the operator, D is a proportional constant of velocity and corresponds to an equivalent viscosity coefficient felt by the operator, and K is a proportional constant of position and corresponds to equivalent spring constant. The device is constructed such that the operator is required of force thus calculated.

In the present embodiment, the respective values of equivalent coefficients are changed according to each task process phase.

Figure 3B:
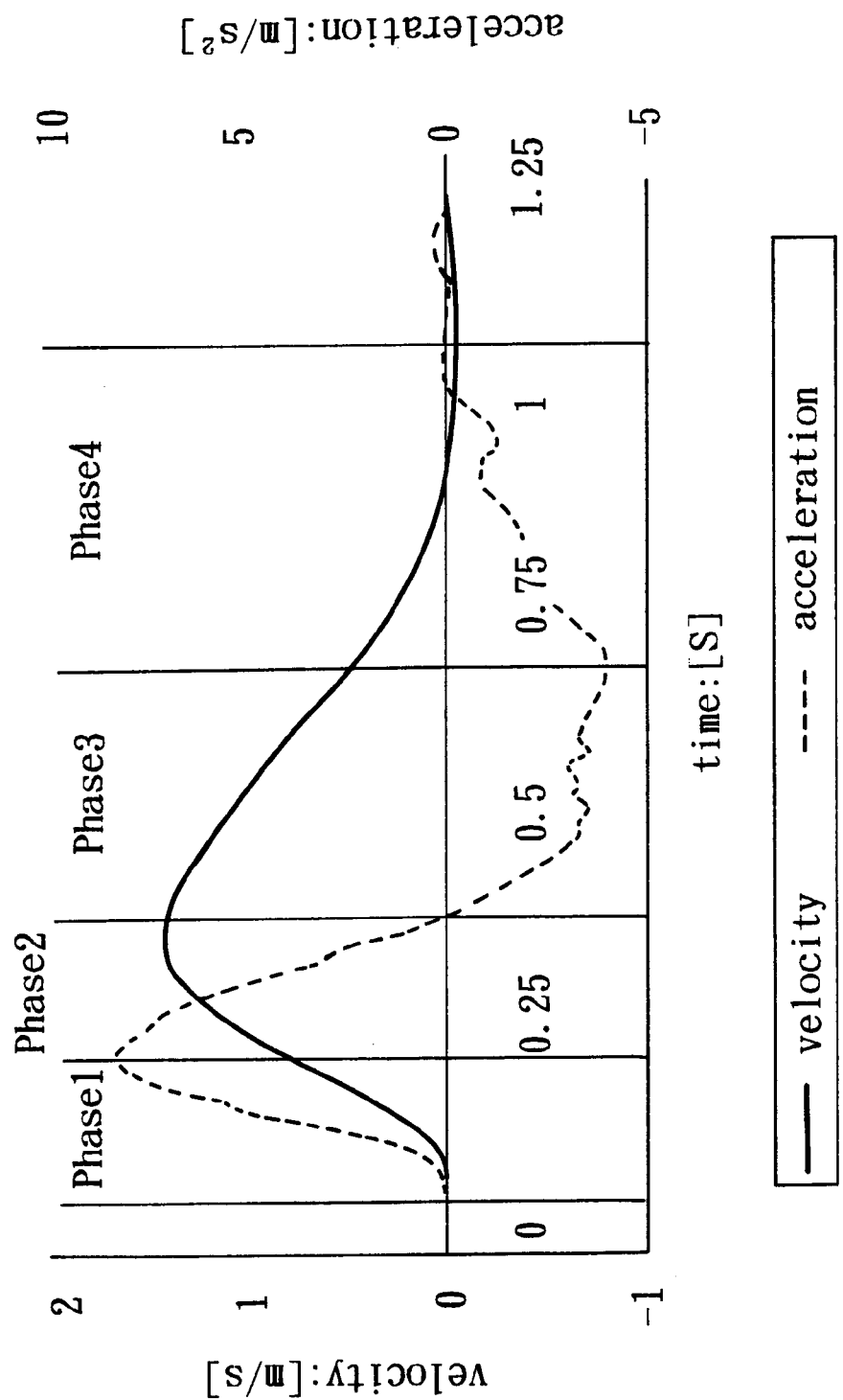
FIG. 3 is an illustration of a relationship between task process phase and equivalent coefficient table.

FIG. 3B is a graph having the time lapsed during carrying work as the axis of abscissas and having carriage speed and acceleration as the axis of ordinates. After a plurality of tested persons performed a various carrying work, it was confirmed that they first accelerated, then decelerated, and positioned the article in common. It was also confirmed that the maximum speed was in the first half of the work and the velocity curve was in a bell shape. Further, it was confirmed that in common to various carrying works, the article was stopped at a target position after going through first, an acceleration prophase where the acceleration is positive and the value increases, then, an acceleration anaphase where the acceleration continues to be positive but the value decreases, a deceleration prophase where the acceleration turns negative and its absolute value increases, and finally, a deceleration anaphase where the acceleration is negative and its absolute value decreases. That is, it was confirmed that the carrying work was performed by going through the each phase in the following order: start→acceleration prophase (phase 1)→acceleration anaphase (phase 2)→deceleration prophase (phase 3)→deceleration anaphase (phase 4)→positioning→end. Further, this is only an example of the phases, and therefore it is also possible to define the phases by analyzing the work with other methods.

As the inventor of the present invention eagerly advanced the research, it was confirmed that the force required of the operator when the operator works as if he is changing the tools to an optimum one for a particular job can be calculated by formula (2) in FIG. 2, when the equivalent weight or mass M, equivalent viscosity coefficient D, equivalent spring constant K, and the like are continuously or discontinuously changed.

In the present embodiment, the outputs from the actuators A1 through A8 are adjusted using formula (3). Terms on upper side of formula (3) are equivalent to the right hand side of formula (1), and they are calculated by the controller. Physically, it is equivalent to the force required for making the heavy article W and the entire system of the work assist device B move at the movement currently performed. On the other hand, the terms on lower side of formula (3) are equivalent to the resultant force calculated by formula (2). This is obtained by adding the forces which are the products of acceleration at that time and equivalent mass, speed at that time and equivalent viscosity coefficient, and the position at that time and equivalent spring constant. The outputs from the actuators A1 through A8 are adjusted such that a sum $F_A$ of the force of the actuators in the direction of the first degree of freedom transmitted to the eighth movable body 8 via a link mechanism equals the value calculated by formula (3). Similar adjustments are made for the second degree of freedom and thereafter. Because the outputs from the actuators A1 through A8 are adjusted as described above, an operator is required to apply the force calculated by formula (2). This force is equivalent to a force required when carrying a lighter article than the heavy article W, and therefore the operator is able to perform the carrying work of the heavy article W feeling the resistance felt when carrying a lighter article. As a result, the movement caused to the lighter virtual article by application of force by the operator is equivalent to the movement caused to a heavy article by the operating force of the operator and the assist force of the assist device.

Further, in the present embodiment, as shown in FIG. 3A, the equivalent mass, equivalent viscosity coefficient, equivalent spring constant, and the like are switched during the course of work. That is, when a dynamic and smooth movement is required, the work is performed with a resistance felt when using an appropriate tool therefor, and when a complicated and accurate work is required, the work is performed with a resistance felt when switching to an appropriate tool therefor. As a result, the operator is able to progress work with a desirable feeling.

Furthermore, appropriate values of equivalent mass, equivalent viscosity coefficient, equivalent spring constant, and the like can be adopted for an operator B and an operator A, respectively, so that the cooperation work system can be tuned to the one each operator finds fit for the work. The operator A, for example, may work at different resistance depending on whether he is in a fatigue state or in a normal state (this corresponds to changing the degree of assistance force of the assist device). Also, the coefficient table may be changed according to the time lapsed after start of the work. Further, instead of providing a coefficient table for each operator, a coefficient table for skilled operators and a coefficient table for unskilled operators may be provided.

Further, the coefficient tables may be corrected after they are prepared. Preferably, the coefficient tables should be programmed and renewed reflecting the change in desirable resistance due to the level of mastery.

According to the above-described embodiment, because a work assist device capable of giving resistance or reaction force an operator feels convenient for performing a good work is realized, it is easier for the operator to perform work, work speed increases, errors are reduced, and work load is reduced.

Further, an operator is able to carry heavy articles that are difficult to move with one's own power while feeling pleasant resistance. This makes the work itself pleasant.

What is claimed is:

1. A work assist device comprising:
a movable body for supporting a heavy article, wherein the movable body is structured to vertically lift the heavy article and transport the heavy article along a horizontal path;
an actuator for actuating the movable body; and
a controller for adjusting an output of the actuator, wherein
the controller controls the output of the actuator such that a perceived moving force of the heavy article as perceived by an operator is less than an actual moving force of the heavy article so that a first force, applied to the movable body by the operator to move the heavy article through the movement of the movable body is less than a second force required to directly transport the heavy article, and
the actual moving force and the perceived moving force of the heavy article fluctuate proportionally during a series of carrying work, the series of carrying work including at least one of: (1) a lifting phase in which the heavy article is lifted vertically; (2) a speed changing phase in which the heavy article is accelerated or decelerated along the horizontal path; and (3) a stopping phase in which the heavy article is stopped.

2. A work assist device comprising:
a movable body for supporting a heavy article, wherein the movable body vertically lifts the heavy article and transports the heavy article along a horizontal path;
an actuator for actuating the movable body; and
a controller for adjusting an output of the actuator,
wherein the controller adjusts the actuator such that a force required for moving the heavy article through the movable body is obtained by subtracting a resultant force proportional to acceleration of the heavy article, a force proportional to speed, and a force proportional to position value from a total force required for moving the heavy article,
and a coefficient proportional to acceleration, a coefficient proportional to speed and a coefficient proportional to position value are changed to reflect a desired resistance during a series of work.

3. The work assist device according to claim 2, wherein a changing pattern of the coefficient proportional to acceleration, coefficient proportional to speed and coefficient proportional to position value is selectable according to one or more indexes including the operator, work duration, experience, and state of fatigue of the operator.

4. The work assist device according to claim 2, wherein the coefficient proportional to acceleration, coefficient proportional to speed and coefficient proportional to position value are changed when task process phase changes.

5. The work assist device according to claim 2, wherein the changing pattern of the coefficient proportional to acceleration, coefficient proportional to speed and coefficient proportional to position value is selectable according to one or more indexes including the operator, work duration, experience, and state of fatigue of the operator.

* * * * *